Oct. 19, 1965     D. N. SCHWARDT ETAL     3,212,396
AUTOMATIC PHOTOGRAPHIC PRINTER
Filed March 12, 1962                    9 Sheets-Sheet 4
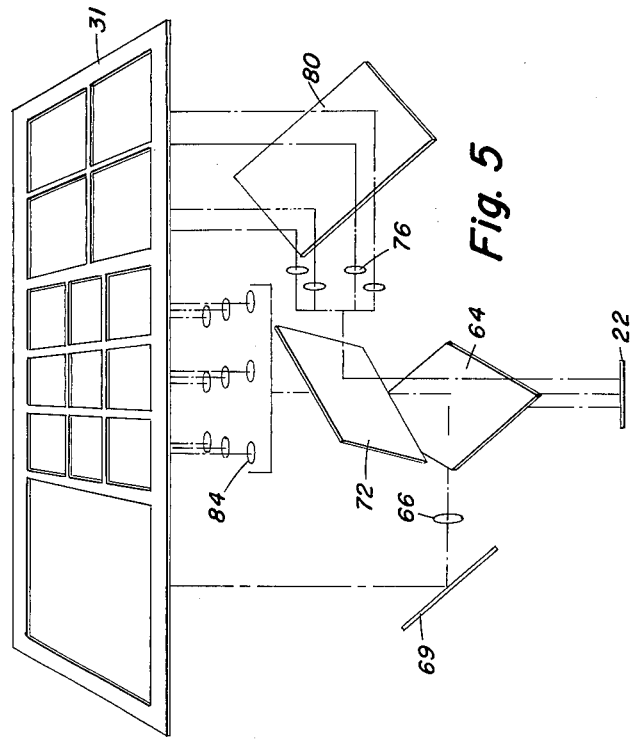
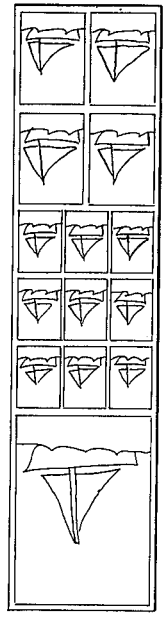
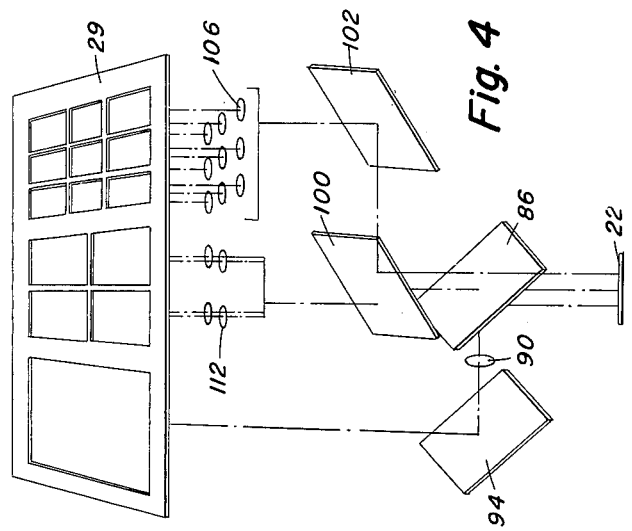
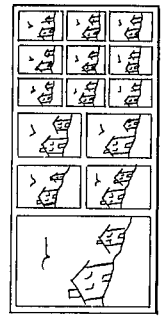
DAVID N. SCHWARDT
JOHN S. POLLOCK
INVENTORS
BY R. Frank Smith
Steve W. Trembow
ATTORNEYS

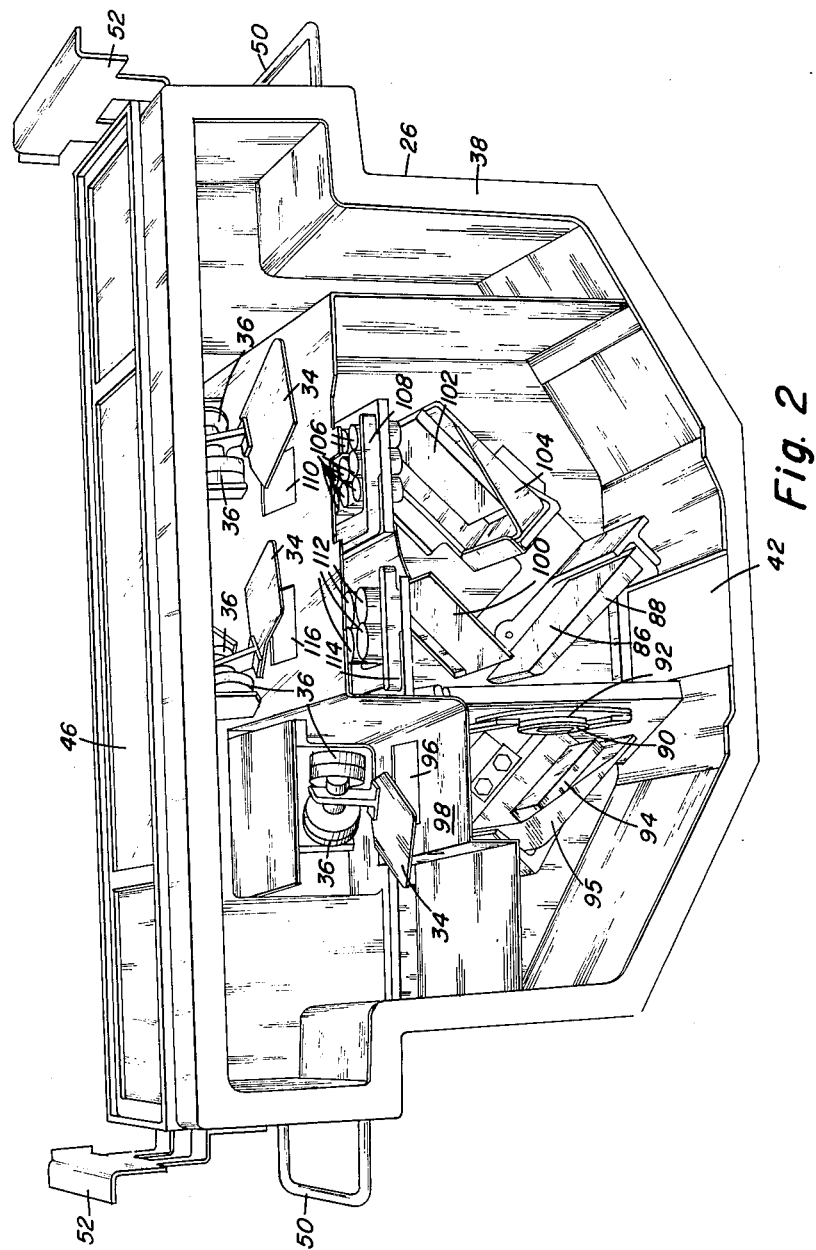

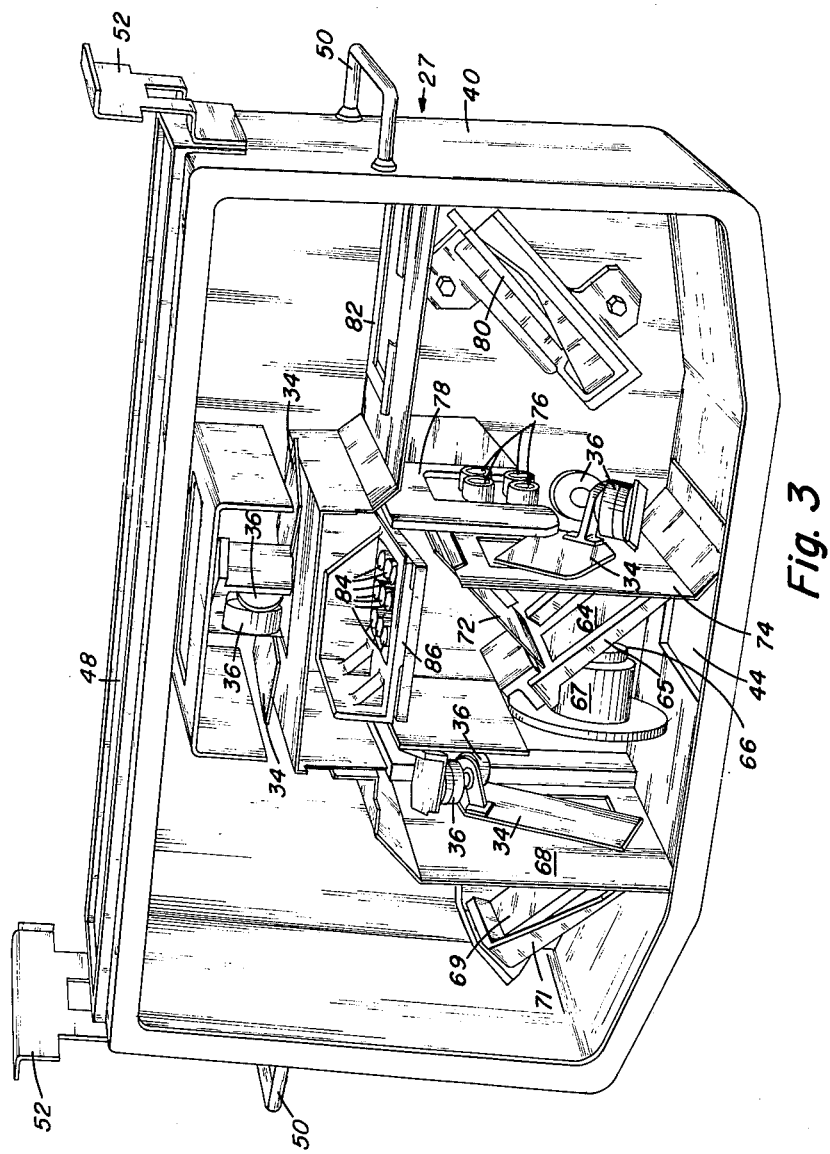

DAVID N. SCHWARDT
JOHN S. POLLOCK
INVENTORS

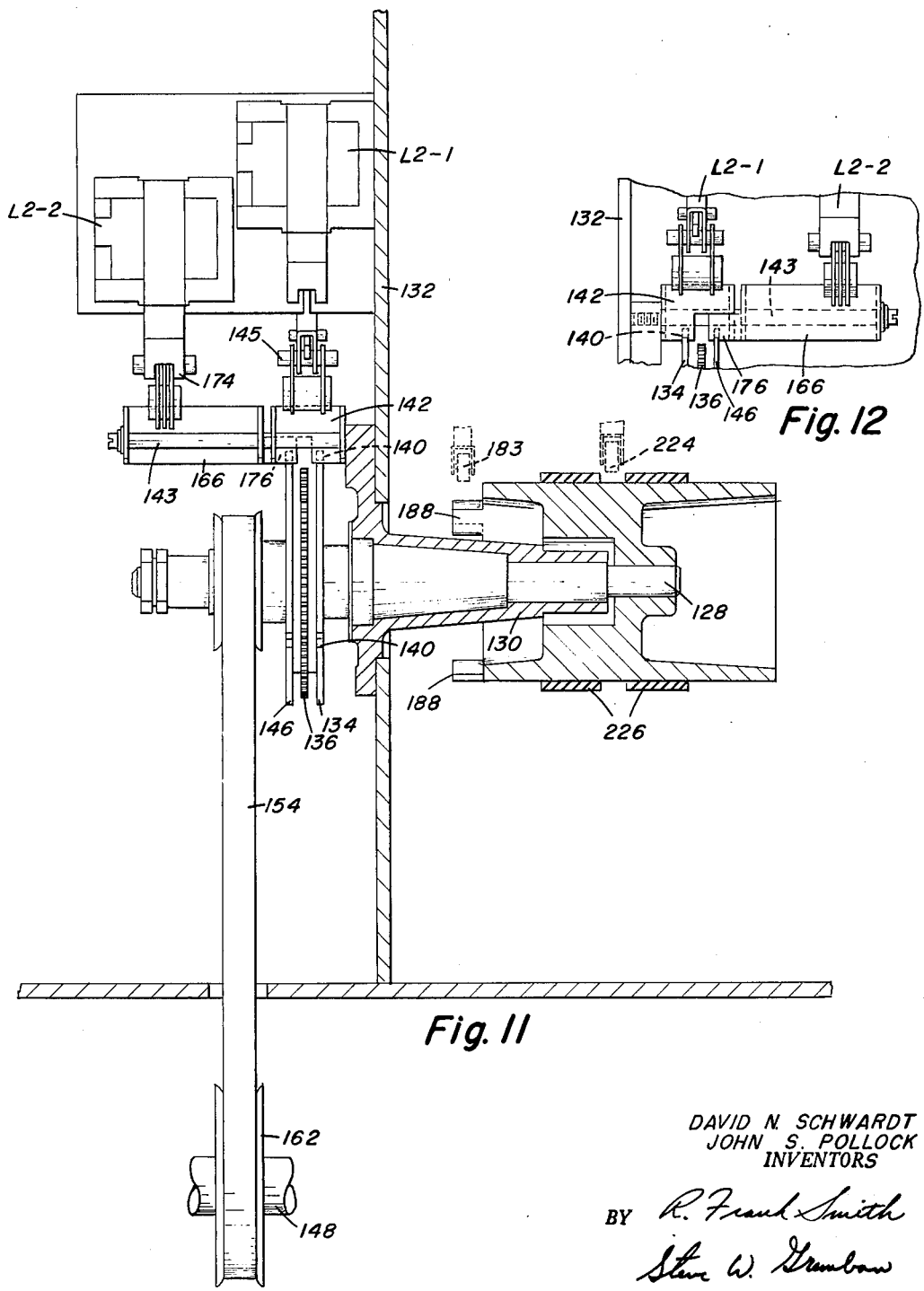

DAVID N. SCHWARDT
JOHN S. POLLOCK
INVENTORS

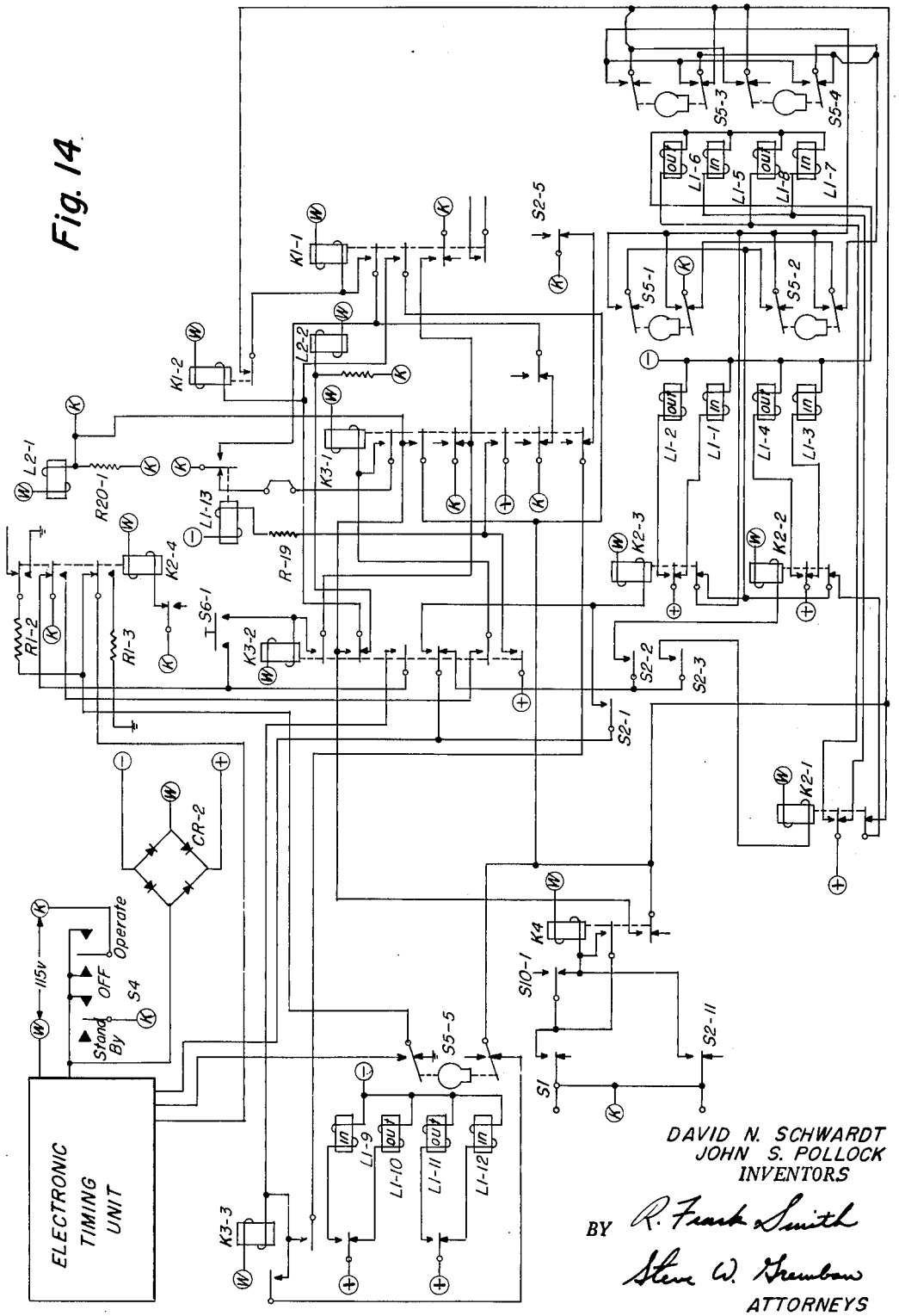

United States Patent Office 3,212,396
Patented Oct. 19, 1965

3,212,396
AUTOMATIC PHOTOGRAPHIC PRINTER
David N. Schwardt and John S. Pollock, Rochester, N.Y., assignors to Eastman Kodak Company, Rochester, N.Y., a corporation of New Jersey
Filed Mar. 12, 1962, Ser. No. 179,004
17 Claims. (Cl. 88—24)

This invention relates generally to photographic printers, and more specifically to an automatic photographic printer for sequentially and simultaneosuly projecting a plurality of groups of images, each group containing a different number of images of different size, from a single negative onto a photographic print material for exposing same.

There has been a continuing need in the photofinishing trade for a printer that will sequentially and simultaneously project a plurality of groups of images, each group containing a different number of images of different size, from a single negative onto a photographic print material for exposing same. The exposed print material when processed converts the images to prints as is well known. This need has been particularly great in the school finishing trade for supplying different sized prints to students. Heretofore, it was necessary for the photographic finisher to either have a separate printer for each size print desired, or a single printer requiring alteration to provide all of the desired sized prints. Since a separate printing operation was required to produce each size print in either alternative, it was extremely difficult for the photographic finisher to produce the various sized prints of equal density and identical color balance. Also, in those instances where due to unforseen circumstances or poor judgment, it was necessary to remake any prints, a resetting of the printer was required. Since the students normally require only a small number of the largest size print, it is extremely inconvenient for the finisher to set up a single printer to take such a limited number of prints. Applicants' automatic printer is designed to eliminate all of the aforementioned time-consuming setup operations and inconveniences by sequentially and simultaneously projecting a plurality of groups of images (convertible into prints upon processing) from a single negative onto a photographic print material so that all of the prints produced are of equal density and identical color balance. This printer is further designed to print innumerable package combinations so that almost any student request for different size prints can be met.

It is therefore one of the preferred objects of this invention to provide an improved automatic printer for simultaneously projecting a plurality of groups of images simultaneously from a single negative onto a photographic print material.

Another object of this invention is to provide an improved automatic printer for projecting a plurality of groups of images simultaneously from a single negative onto a photographic print material which, when processed, produce prints which are all of equal density and identical color balance.

A further object of this invention is to provide an improved automatic printer for projecting a plurality of groups of images from a single negative either lengthwise or crosswise of a photographic print material.

Still another object of the invention is to provide an improved automatic photographic printer having interchangeable optical multiplier units for accommodating different negative sizes, and providing either a front-to-back (vertical) or side-to-side (horizontal) print format.

A further object of the invention is to provide an improved automatic printer having interchangeable programming drums for producing a pre-selected package of prints automatically, repetitively, and uniformly without further manipulations or adjustments by the operator.

Still another object of the invention is to provide an automatic printer having a mechanism for automatically sensing a splice and advancing the web and splice through the exposure station.

A further object of the invention is the provision of an improved automatic printer having an extremely high productivity rate of individual photographic prints per hour.

Still another object of this invention is to provide an automatic printer which reduces printing costs, and minimizes color and density variation which normally results when different print sizes are made on different photographic material in different printers.

Objects and advantages other than those set forth above will be apparent from the following description when read in connection with the accompanying drawings, in which:

FIG. 2 is an enlarged perspective view of the optical multiplier unit of the printer shown in FIG. 1 with its cover removed and further adapted to project a plurality of groups of image exposures crosswise of the print material or in a vertical print format;

FIG. 3 is a view similar to FIG. 2 showing an optical multiplier unit for producing a package of prints in which the prints are lengthwise of the print material or in a "horizontal" format;

FIG. 4 is a schematic representation in perspective of the optical paths through the optical multiplier unit shown in FIG. 2;

FIG. 5 is a view similar to FIG. 4 showing the optical paths through the optical multiplier unit of FIG. 3;

FIG. 11 is an enlarged side elevation view partially in section taken from the right side of the structure shown in FIG. 10;

FIG. 12 is a fragmentary view of a portion of the structure of FIG. 11 looking at it from the rear;

FIG. 14 is a schematic electrical wiring diagram for the printer;

FIG. 15 is a top plan view of a package of prints having a vertical print format; and FIG. 16 is a view similar to FIG. 15 of a package of prints having a horizontal print format.

GENERAL DESCRIPTION

Figure 1:
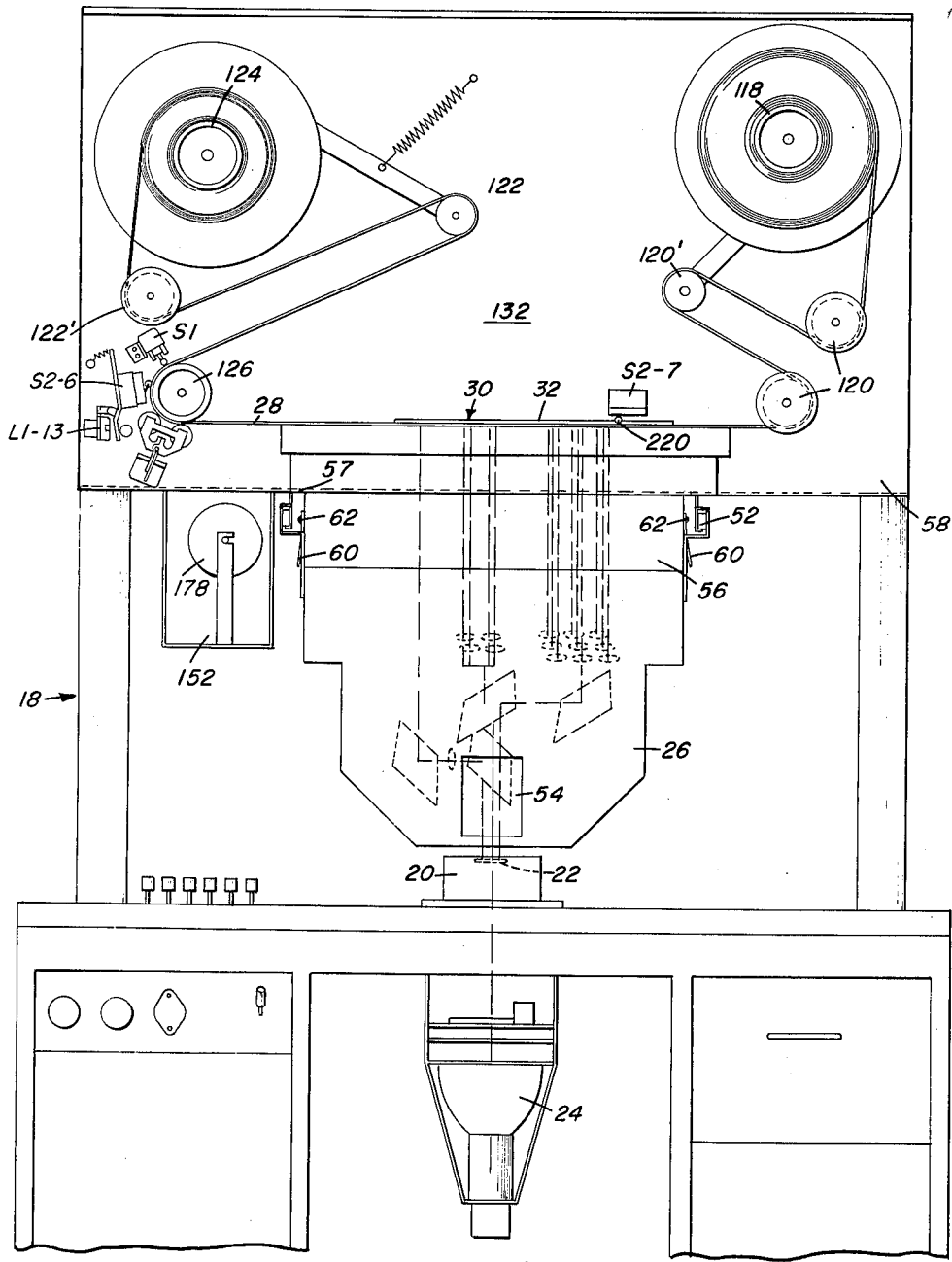
FIG. 1 is a fragmentary, side elevation view showing a preferred embodiment of the automatic printer of this invention with some of the cover portions removed and the optical system shown schematically in dotted lines and primarily in perspective.

As shown in the drawings, particularly FIG. 1, a preferred embodiment of the automatic photographic printer 18 of this invention comprises a negative carrier 20 defining a negative plane for supporting a transparent subject or negative 22 in a substantially flat condition in optical alignment with a light source 24 by which it is illuminated. A plurality of groups of images of the subject are simultaneously projected by the light source in enlarged form through interchangeable optical multiplier units 26, 27, to be explained in detail hereinafter, onto a suitable light-sensitive printing material 28 for exposing same. The printing material 28 is adapted to be held in a substantially flat condition in the printing plane, referred to as an exposure station 30, in superimposed relation with the subject by suitable apertured masks 29, 31 (see FIGS. 4 and 5) and a platen 32. The platen 32 may be of any well known type and is movable to and from engagement with the print material 28 by any well known mechanism, not shown. As is customary in high production printers of this type, feed means are provided for intermittently feeding the printing material 28 in the form of a long web across the exposure station 30. Means, not shown, may also be provided for intermittently feeding different subjects into printing position in the negative plane. The exposure is controlled by a plurality of opaque electromagnetic shutter blades 34 (see FIGS. 2 and 3) in the optical multiplier units 26, 27 to move between a normally closed position in which they cut the printing beam off from the printing material 28, and an open position in which they are moved out of the printing beam and allow the projected light to fall on the printing material 28. The shutter blades 34 are of the type adapted to be held in a closed position by an electromagnet 36, and are moved to an open position by another identical electromagnet 36 when the latter is energized at the same time the former is de-energized.

*Optical multiplier units*

As indicated earlier, the automatic photographic printer 18 of this invention is adapted to interchangeably receive optical multiplier units 26, 27; in fact, two of such units are normally provided for each negative size projected. Each of the units is adapted to simultaneously project, for example, three groups of images, each group containing a different number of images of different size, onto the printing material 28. The exposed images when processed will produce prints from one unit in which the top and bottom ofeach print will be parallel to the sides of the print material to form a vertical print format as seen in FIG. 15, or from the other unit in which the sides of each print will be parallel to the sides of print material 28 to form a horizontal print format as seen in FIG. 16. The optical multiplier units 26, 27 more specifically comprise cast-aluminum housings 38, 40 respectively, having sealed transparent entrance windows 42, 44 and exit windows 46, 48. The units 26, 27 have identical handles 50 on opposite sides thereof by which they may be manually carried, and further have identical brackets 52 secured to their sides by which they may be slidably mounted on locating rails 53 of printer 18. The units further have dowel pins on their back surfaces, not shown, for accurately locating them on printer 18 with respect to the negative and paper planes. Each unit 26, 27 has a cover as shown in FIG. 1 which is provided with a window 54 through which the operator may view the negative 22 between exposures and the film advance. An electromagnetically operated shutter, not shown, but similar to shutters 34, 36, covers window 54 during an exposure so that the printing light is prevented from entering the operator's eyes.

A rectangular open ended, box-like light shield 56 (see FIG. 1) interposed between the printer cabinet 58 and multiplier unit 26 provides a light-lock between the optical multiplier unit 26 and the cabinet 58. The light shield 56 telescopes within an opening 57 in cabinet 58 and is releasably held in its inoperative position by spring arms 60 secured to the shield and having a nub 62 co-operating with the edge of the cabinet opening to form a detent. The movement of the shield 56 between operative and inoperative positions, allows for convenient change of optical multiplier units 26, 27 and provides for lighttight operation in room light.

*Optical multiplier unit for horizontal print format*

The optical unit 27 (see FIG. 3) for producing a horizontal print format has a lower beam splitter 64 comprising a pellicle film stretched over a cast-iron frame 65 secured to housing 40 and coated to give the desired ratio of reflection and transmission. The film reflects a portion of the light passing through negative 22, through a single lens 66 supported by a lens mount 67 secured to housing 40 to form an image beam. The image beam passes through an apertured baffle 68 and strikes a mirror 69 or similar reflecting surface mounted in a frame 71 secured to housing 40 at an angle of approximately 45° to the reflected image beam. The mirror 69 reflects the image beam through the exit window 48 onto the print material 28 to make a single image exposure thereon. The film 64 further transmits a portion of the light passing through negative 22 against a coated glass beam splitter 72 secured to housing 40 and mounted at approximately an angle of 45° to reflect the light through an apertured baffle 74. The light continues through four lenses 76 supported by a lens mount 78 secured to housing 40, and the images from the lenses strikes mirror 80 mounted at approximately an angle of 45° to the image beam for reflecting four images of equal size through an apertured baffle 82 and exit window 48 onto print material 28 for exposing same. The beam splitter 72 further transmits the remainder of the light passing through negative 22 through a cluster of nine lenses 84 supported by a lens mount 86 secured to housing 40 to form nine images projected through an aperture in baffle 82, and through exit window 48 onto print material 28 for exposing same. As indicated heretofore, shutter blades 34 co-operate with respective apertures in baffles 68, 74, 82 to cover and uncover the apertures to block or unblock respectively the passage of a light beam therethrough. The blades 34 are movable into their blocking or unblocking positions by means of the aforementioned identical electromagnets 36.

Since the mirrors 69 and beam splitter 64 are spaced apart a sufficient distance, it is possible to vary the position of the lens unit 67 therebetween to achieve proper magnification.

The baffles 68, 74 and 82 are arranged in housing 40 to separate the printing beams and thereby eliminate cross reflection between them. The lenses 66, 76 and 84 are all properly focused in their mounts, and any necessary color filters, not shown, interposed in the separate printing beams to provide, assuming all of the apertures are uncovered, three groups of different sized images on print material 28, all of which are focused and in color balance. When processed, the left group contains one large print, the middle group contains nine equal but smaller size, prints and the right group contains four prints of equal size intermediate the other two sizes as seen in FIG. 16.

*Optical multiplier unit for vertical print format*

The optical unit 26 (see FIG. 2) for producing a vertical print format has a pellicle film 86 similar to film 64 stretched over a frame 88 secured to housing 38. The film 86 reflects a portion of the light passing through negative 22 through a single lens 90 supported by a lens mount 92 secured to housing 38, and the image beam formed thereby directed against a mirror 94 mounted in a frame 96 secured to housing 38 at an angle of approximately 45° to the reflected image beam. The mirror 94 reflects the image beam through an aperture 96 in a baffle 98, and through exit window 46 onto print material 28 to make a single image exposure thereon. The film 86 further transmits another portion of the light passing through negative 22 against a coated glass beam splitter 100 secured to housing 38 and mounted at approximately an angle of 45° which reflects the light beam against a mirror 102 mounted in a frame 104 secured to housing 38 parallel to beam splitter 100. The mirror 102 reflects the light beam image through a cluster of nine lenses 106 supported by a lens mount 108 secured to housing 38, and the image beam formed thereby passes through an aperture 110 in baffle 98, and through window 46 onto print material 28 for exposing same. The beam splitter 100 further transmits the remainder of the light passing through negative 22 through a cluster of four lenses 112 supported by a lens mount 114 secured to housing 38, and the image beam forward thereby passes through an aperture 116 in baffle 98, and through window 46 onto print material 28 for exposing same. As indicated before, shutter blades 34 co-operate with apertures 96, 110, 116 to cover and uncover the apertures to block and unblock respectively the passage of a light beam therethrough. The blades 34 are movable into their blocking or unblocking positions by means of the aforementioned identical electromagnets 36.

The baffle 98 is arranged to separate the printing beams and thereby eliminate cross reflection therebetween. The lenses 90, 106 and 112 are all properly focused in their mounts, and any necessary color filters, not shown, interposed in the separate printing beams to provide, assuming all of the apertures are uncovered, three groups of different sized images on print material 28, all of which are focused and in color balance. When processed, the left group contains one large print, the middle group contains four equal but smaller size prints, and the right group contains nine equal prints of still smaller size as seen in FIG. 15.

Since the physical distance between beam splitter 86 and mirror 94 is not sufficient to permit varying lens unit 92 to achieve proper magnification, it is necessary to vary the distance between negative 22 and beam splitter 86. This is accomplished by mounting the brackets 52 at a different height along the sides of each unit 38 for each negative size used, so that when unit 38 is mounted on printer 18, the distance between the negative 22 and beam splitter 86 is varied.

*Print material transport system*

The transport system for transporting the print material 28 (see FIG. 1) from a supply reel 118 over guide rollers 120, pressure roller 120' through the exposure station 30, over more guide rollers 122, pressure roller 122' and onto takeup reel 124 comprises a transport roller 126 over which print material 28 is trained. The roller 126 is mounted on a shaft 128 (see FIGS. 10–12) supported by a frame 130 secured to a wall 132 of printer 18, and a ratchet 134 is rigidly secured to transport roller shaft 128, and is connected through any suitable clutch, not shown, to a drive sprocket 136 loosely rotatable on shaft 128. Sprocket 136 is driven by an endless chain 138 driven by some suitable motor, not shown. The clutch may be any commercially available clutch of the type adapted to slip when the driven member is held. Each revolution of the transport roller 126 is designed to advance print material 28 a predetermined number of inches, and ratchet 134 has a plurality of teeth 140 engageable by a dog 142 pivotal on shaft 143 for limiting the print material advance to a fraction of said predetermined advance. The material advance dog 142 is controlled by a solenoid L2–1 connected to dog 142 by a linkage 145 and which when energized withdraws dog 142 from one of the teeth 140 of ratchet 134 causing transport roller 126 to be driven for advancing print material 28. The material 28 is transported until solenoid L2–1 is deenergized, causing dog 142 to re-engage one of the teeth 140 of ratchet 134. It is possible to accurately control the length of print material advance to the pre-determined length of a fraction thereof by properly controlling the energization and the deenergization of solenoid L2–1.

*Sequence programmer*

Figure 6:
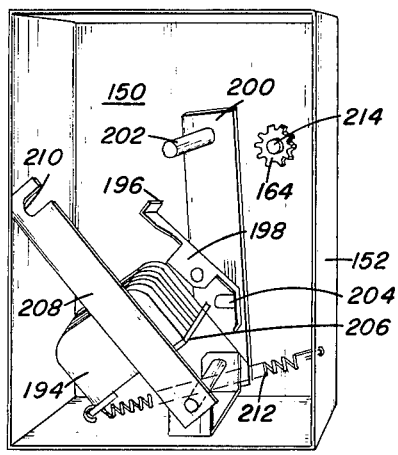
FIG. 6 is an enlarged perspective view of the programming mechanism shown in FIG. 1 with the drum removed for purposes of clarity.
Figure 9:
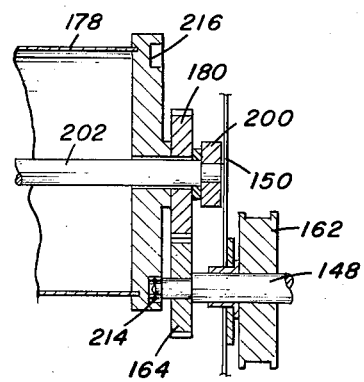
FIG. 9 is a fragmentary plan view partially in section of the structure shown in FIG. 8.

A ratchet 146 (see FIGS. 10–12) similar to ratchet 134 is loosely mounted on shaft 128, and is driven by a slip clutch, not shown, which is interposed between sprocket 136 and ratchet 146. The slip clutch is coaxial with and similar to the aforementioned clutch. A stub shaft 148 (see FIGS. 6 and 9) is supported for rotation by the back plate 150 of a programming drum box 152, and a belt 154 encircles a pulley 156 releasably secured to ratchet 146, a pulley 158 mounted on one end of an idler shaft 160 and a pulley 162 mounted on one end of shaft 148 for driving a pinion 164 mounted on the opposite end of shaft 148. A dog 166 similar to dog 142 is urged by gravity and a spring 168 into its latched position in engagement with one of the ratchet teeth 170 to hold ratchet 146 from turning. The dog 166 is controlled by a solenoid L2–2 connected to dog 166 by a linkage 174 and which is adapted when energized to be moved to its unlatched position, withdrawing dog 166 from teeth 170, whereupon ratchet 146 is turned by drive belt 154 through the slip clutch. The dogs 142, 166 are interlocked by a laterally extending portion 176 (see FIG. 12) of dog 166 being disposed under dog 142 so that upon energization of solenoid L2–2, both dogs 142, 166 will be moved to their unlatched positions. However, upon energization of solenoid L2–1, only dog 142 will be moved. It is obvious, therefore, that when solenoid L2–2 is energized, both dogs 142–166 will be moved to their unlatched positions permitting both ratchets 134, 146 to turn in synchronism for advancing print material 28 and driving a programming drum 178 by pinion 164 meshing with a gear 180 integral with drum 178. Upon operation of the solenoid L2–1, only dog 142 is moved to its unlatched position for advancing the print material 28 without driving programming drum 178.

One of the reasons for advancing print material 28 without driving programming drum 178 is to permit the operator to print identifying information for any particular series of prints. For instance, in a school situation, the photographer may photograph a blackboard on which is written identification information for the particular classroom which is being photographed. This identification information is important during the printing operation and facilitates sorting the prints. The particular identification information is initiated by the operator pressing a button S6–1 to make a single exposure in which printer 18 makes one print of the identification negative, advances print material 28 a single image group length, and the cycle is terminated. This single exposure cycle is performed automatically without moving programming drum 178 from its initial position. This cycle may also be used for printing one copy of the teacher or any other negative if this is so desired. During this single-exposure cycle, only the left-hand beam shutter is opened.

Figure 13:
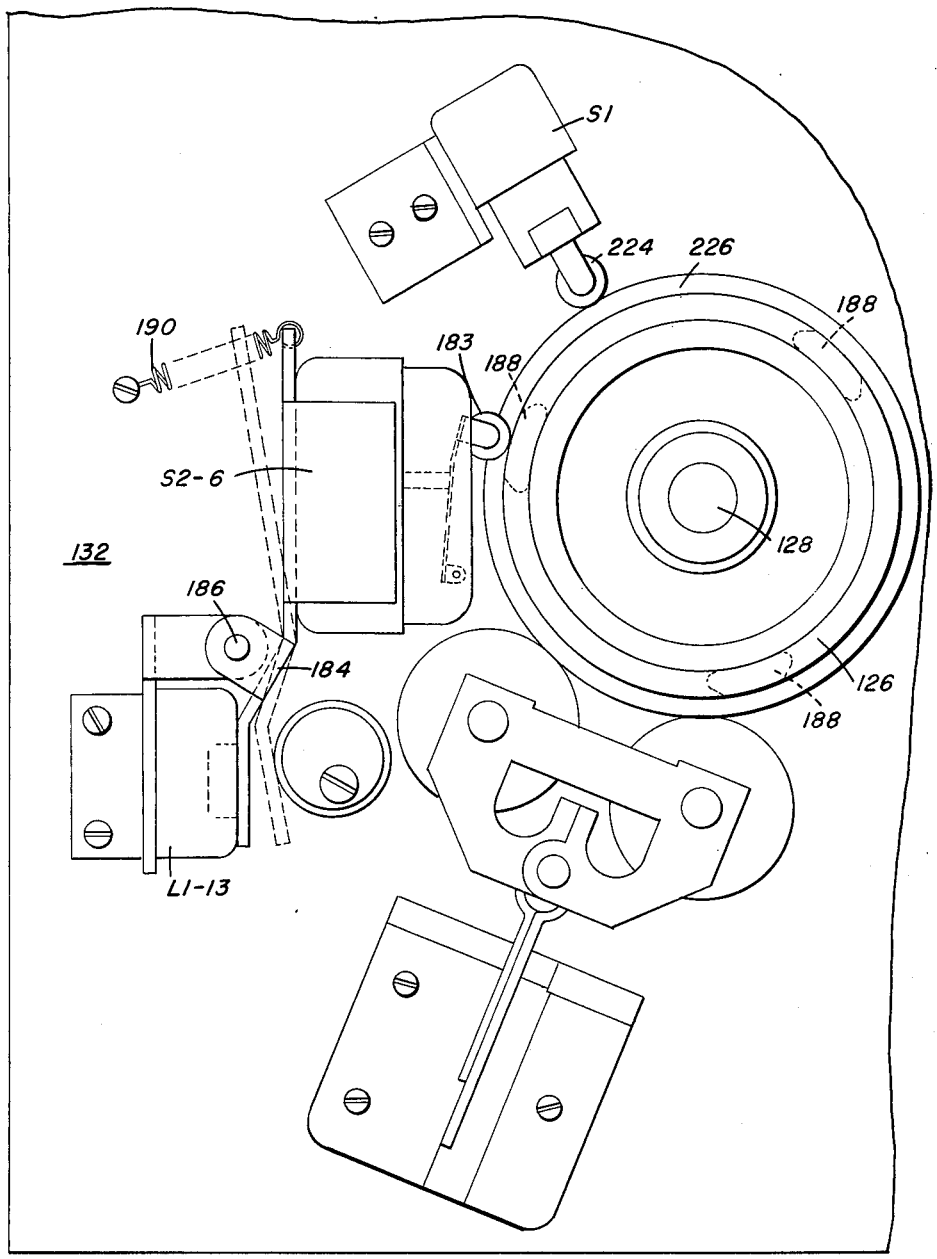
FIG. 13 is an enlarged side elevation view of a portion of the apparatus shown in FIG. 1.

Assuming that printer 18 is set up to produce prints having a vertical format, and the multiplier unit 26 and mask is designed to produce three groups of images simultaneously, each image being 5 x 3½ inches in size. Assuming further that transport roller 126 will give a 10½-inch print material advance for every revolution, ratchet 134 would then be provided with three teeth each adapted to produce a print material advance of 3½ inches. During the single-exposure cycle, momentary actuation of solenoid L2–1 will automatically produce a 3½-inch print material advance. A problem occurs, however, if the operator decides to print a package of prints having a horizontal format in which each print group in this instance is twice the size of each group for the vertical format, or 5 x 7 inches in size. For this type setup, it is necessary for solenoid L2–1 to remain energized until after the first tooth 140 of ratchet 134 has passed, so that it may catch the second tooth and provide a 7-inch paper advance. This is achieved by a counter micro-switch S2–6 (see FIG. 13) mounted on a bracket 184 pivoted at 186 and having an arm 183 adapted when moved into an operative position by means of a solenoid L1–13 to be actuated by one of three cams 188 on the transport roller. This switch 182 is actuated in the rest position of transport roller 126 by the first cam as seen in FIG. 13. During a single exposure cycle, solenoid L2–1 is energized moving dog 142 to its unlatched position, releasing transport roller 126 which is driven to advance print material 28. After roller 126 has transported print material 28 over 3½ inches, and the first tooth of ratchet 134 has passed dog 142, the second cam 188 on roller 126 actuates arm 183 of counter switch 182, breaking the circuit to solenoid L2–1 which is de-energized, releasing dog 142. The dog thereby catches the next tooth 140 and the print material advance is stopped after it has advanced 7 inches. The counter switch solenoid L1–13 is also released and returned to its inoperative position by a spring 190.

More specifically, with reference to the wiring diagram in FIG. 14, the operation of printer 18 to provide a single exposure sequence in which only the left print group is exposed and the print material is advanced one print group without turning the drum 178 is as follows:

(A) The operate-standby-off switch is moved into the operate position, actuating the drive motor and the printer lamp 24. The single exposure switch S6–1 is closed energizing relay K3–2. This causes the following:

(a) a holding circuit is established through K3–1.
(b) drum solenoid L2–2 circuit is opened by K3–2.
(c) K3–2 closes so that when the shutter IN switch is actuated, power will be available for the paper advance without turning the programming drum.
(d) circuit for beam switches S2–2, and S2–3, are opened by K3–2.
(e) circuit to beam switch S2–1, is bypassed by K3–2.
(f) K3–2 closes so that when the paper-advance guard relay K2–4 is energized, power will be available to energize K3–1.
(g) ratchet solenoid L1–13 is energized and in turn actuates the ratchet switch S2–6.
(h) K3–3 is energized through K3–2 and the paper-advance guard relay K2–4.

(B) K3–3 initiates the exposure for the LEFT beam only.

When K3–3 pulls in, it causes the following:

(a) a holding circuit is established through the end-of-cycle switch S2–5, K3–1 and K3–3.
(b) the viewing window in the Optical Multiplier is covered when the viewing shutter OUT solenoid L1–10 is de-energized by K3–3 and the viewing shutter IN solenoid L1–9 is energized by K3–3.
(c) the lamp shutter is moved out of the beam when the lamp shutter IN solenoid L1–12 is de-energized by K3–3 and the lamp shutter OUT solenoid L1–11 is energized through K3–3.

(C) Actuation of the lamp shutter closes the lamp shutter OUT switch S5–5 and actuates the timing unit which may be of any known type.

(D) Relay K1–1 is energized through K1–2 and the normally open contacts of S5–4, S5–3, S5–2 and S5–1 OUT switches and S5–1 IN (normally closed). This causes the following:

(a) holding circuit for K1–1 is established through K3–1, the drum release switch S2–4 and K1–1.
(b) K1–1 closes so that when dark shutter 1 IN is actuated, power will be available to operate paper-advance solenoid L2–1 at the end of the exposure.

(E) Paper-advance solenoid 62–1 is energized through K3–2, K1–1, and shutter IN switches S5–3, S5–4, S5–2, S5–1. This function actuates the paper-advance dog and the paper-advance guard switch S9, causing the following:

(a) paper advances,
(b) paper-advance guard relay K2–4 is energized,
(c) relay K3–1 is energized through K3–2 and paper-advance guard relay K2–4.

(F) Relay K3–1 causes the following to happen:

(a) a path is provided through K3–1 so paper-advance solenoid L2–1 will not be de-energized when K1–1 is de-energized.
(b) K3–1 is opened. K3–2 is held in by K1–1.
(c) K3–1 provides an alternate circuit for ratchet solenoid L1–13.
(d) K3–3 is de-energized by K3–1.
(e) K3–1 opens the holding path for K1–1. K1–1 continues to be energized through ratchet switch S2–6.

The single exposure sequence described so far is the same no matter what type of multiplier unit is used. From this point on, the sequence differs slightly for each type of multiplier unit. If a horizontal multiplier unit is used, the sequence is as follows:

(A) A holding circuit for K3–1 is established through K3–1. This circuit becomes active when the ratchet switch S2–6 is de-actuated.

(B) When the paper-drive roller has turned a few degrees, the cam that actuates the ratchet switch S2–6 releases the switch. This action causes the following:

(a) the holding circuit to K3–1 is completed through the ratchet switch S2–6.
(b) K1–1 is de-energized by ratchet switch S2–6. K3–2 is de-energized by K1–1. K3–2 breaks the primary energizing circuit for K3–1, which remains energized through ratchet switch S2–6.
(c) circuit to paper-advance solenoid L2–1 is maintained through K3–1 after K1–1 is de-energized.
(d) when the paper has advanced 3½ inches, a second cam on the paper-drive roller again actuates ratchet switch S2–6. This de-energizes K3–1.

(C) De-energizing K3–1 terminates the single-exposure sequence as follows:

(a) the paper-advance solenoid L2–1 is de-energized by K3–1. The dog drops and engages the next ratchet tooth, thus stopping the paper advance at 7 inches.
(b) the ratchet solenoid L–13 is de-energized by K3–1.
(c) paper-advance guard switch S9 is actuated, de-energizing paper-advance guard relay K2–4.

If a vertical multiplier unit is used, the following sequence would follow F9e above:

(A) When the paper-drive roller has turned a few degrees, the cam which actuates the ratchet switch S2–6 releases the switch. This action causes the following:

(a) K1–1 is de-energized by ratchet switch S2–6.
(b) K3–2 is de-energized by K1–1.
(c) K3–1 is de-energized by K3–2.
(d) ratchet solenoid L–13 is de-energized by K3–1.

(B) The single-exposure sequence is terminated when the paper-advance solenoid L2–1 is de-energized by K3–1. The dog drops and engages the first ratchet tooth, thus stopping the paper advance at 3½ inches. The dog actuates paper-advance guard switch S9, de-energizing paper-advance guard relay K2–4.

Drum

Figure 8:
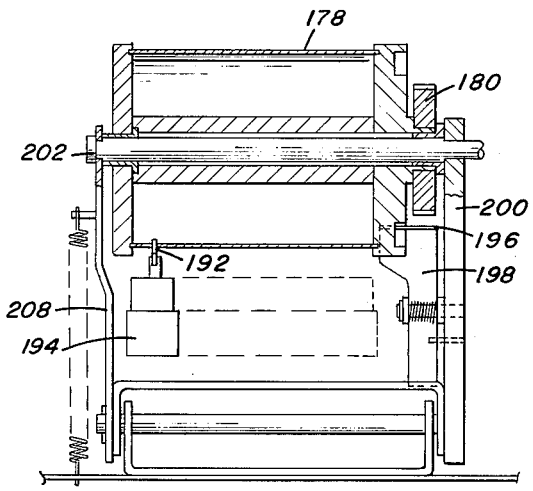
FIG. 8 is a section view taken along line 8—8 of FIG. 7.

The heart of the programming system comprises the aforementioned drum 178 having a perforated periphery into which easily snapped-in clips 192 (only one of which is shown in FIG. 8) may be inserted in five different rows. The clips 192 in each row are adapted to actuate micro-switches S2–1, S2–2, S2–3, S2–4 and S2–5, only one of which is shown in FIG. 8, upon one revolution of the drum for controlling the print material advance, selection of the printing beams, and length of cycle. Three rows of clips 192 control the shutters 34, 36 of the three printing beams, one row for each printing beam. Another row controls the length of print material advance following each exposure, and the last row controls the length of cycle. In the initial position of drum 178 a clip 192 in each of the three rows actuates shutter micro-switches S2-1, S2-2 and S2-3 to complete the electrical circuit to the shutter electromagnets 36.

The length of the print material advance is controlled by a clip 192 in the fourth row which as it is moved past micro-switch S2-4 disconnects the circuit to solenoid L2-1. This de-energizes solenoid L2-1 causing dog 142 to move into its latched position in which it drops against the periphery of ratchet 134, and is engaged by the next ratchet tooth 140. In this way, any print material advance length can be obtained in increments from 3½ inches to a maximum depending upon programming drum 178.

A clip 192 in the last row momentarily actuates micro-switch S2-5 causing relay K-3 to be de-energized terminating the cycle.

Consequently, it can be seen that the position of clips 192 automatically controls the cycle of the printer 18 for giving the number of "print groups" in a package as determined by the individual customer. Rearranging clips 192 will provide a different package. By selecting the proper programming drum 178, any combination of one, two or three print groups can be obtained in which each print group comprises 1, 4, or 9 prints on one print area 3½ x 5 inches or 5 x 7 inches.

The particular programming drums 178 must be so designed that they will return to their original or home position after each package has been printed. If this were not the case, subsequent packages would not be the same. Accordingly, different drums 178 are needed to produce different package combinations. For example, one drum 178 for producing package combinations of 1, 2, 4 or 8 print groups has an integral gear 180 having 32 teeth co-operating with drive pinion 164 to produce a speed ratio between transport roller 126 and drum 178 of 8 to 3 for the vertical format printing and 16 to 3 for the horizontal print format. The drum further has 8 angularly spaced holes in each row to receive the actuating clips 192. The drum 178 for producing a package combination of 1, 2, 3 or 6 print groups has a 24-tooth gear 180 co-operating with drive pinion 164 to produce a speed ratio between transport roller 126 and drum 178 of 6 to 3 for the vertical print format and 12 to 3 for the horizontal print format. This drum has 6 angularly spaced holes in each row receiving the actuating clips 192. Another drum 178 for producing a package combination of 1, 2, 5, or 10 print groups has a 40-tooth gear 180 co-operating with pinion 164 to provide a speed ratio between transport roller 126 and drum 178 of 10 to 3 for the vertical print format or 20 to 3 for the horizontal print format. This drum has 10 angularly spaced holes in each row for receiving the actuating clips 192. The aforementioned drums and gear ratios are illustrative only, and are not intended to exclude other possible variations.

Figure 10:
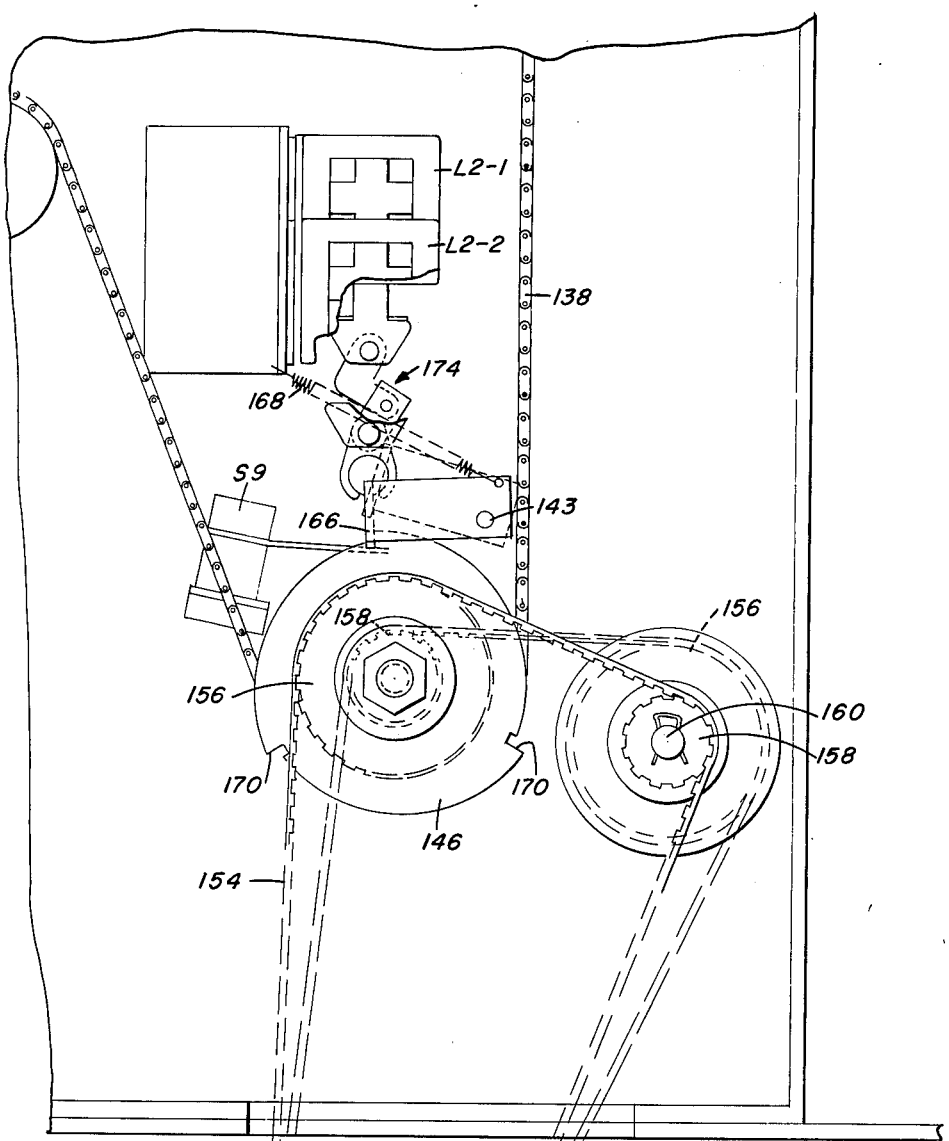
FIG. 10 is a fragmentary side elevation view showing a portion of the drive system and the solenoids for controlling the paper advance and the programming drum.

In order that the same drums 178 may be used for both the vertical and horizontal print format, a means has been provided to change the relative speeds of the transport roller 126 and drum 178 by a factor of two. Hence, the drum 178 would turn one-half as fast while printing a 7-inch print group as it would printing a 3½-inch print group. This speed change is accomplished by interchanging the two pulleys 156, 158 on the end of shafts 128, 160 as seen in FIG. 10. It, of course, is also possible to use the speed ratio of transport roller 126 and drum 178 used for the vertical or 3½-inch print group for the horizontal or 7-inch print group by spacing the clips 192 twice as far apart on the drum 178. This would result in reducing the number of 7-inch prints or the number of packages secured from each drum to a half of the number possible if the speed ratio were changed, but eliminates the time-consuming task of interchanging the two pulleys 156, 158.

Figure 7:
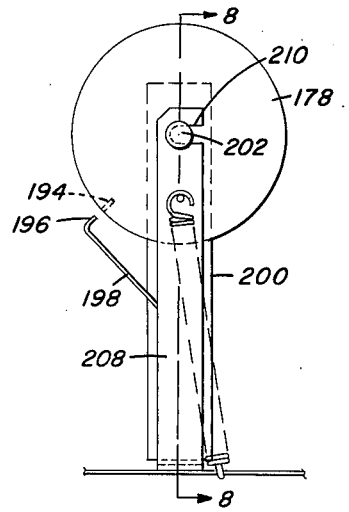
FIG. 7 is an enlarged side elevation view of a portion of the programming mechanism shown in FIG. 1.

The drum 178 is designed so that it may be assembled into the programming drum box 152 in only one way. A slot 194 (see FIG. 7) in the end of each drum 178 must be aligned with a lug 196 on a pawl 198 in programming drum box 152 before it may be pushed into home position. The pawl 198 is pivotally mounted on a pivotal arm 200 which supports a drum shaft 202 cantilevered from one end thereof. The pawl 198 is spring biased in a clockwise direction (see FIG. 6) into engagement with an abutment 204 on arm 200, and is automatically retracted from slot 194 by an extension 206 in the base of a pivotally mounted micro-switch carrier 208 as it is swung into its operative position in which a slot 210 at one end thereof supportingly engages the free end of the drum shaft 202. An over-center spring 212 holds carrier 208 in its operative or inoperative position. Since the various drums 178 have different sized gears 180, there must be a variable center distance between the drum gear 180 and pinion 164. This center distance between drum gear 180 and pinion 164 is controlled (see FIG. 9) by a miniature ball bearing 214 pressed on an extension of the pinion shaft 148 and adapted to ride in an annular groove 216 machined into the end of each programming drum 178. This groove 216 is cut at a different radius for each size drum gear 180. To prevent an operator from inadvertently starting printer 18 without moving the micro-switches 194 back into operating position, the printer is provided with an electrical interlock, not shown, so that it will not operate with the switches out of position. This prevents attempting to drive the programming drum 178 with lug 196 engaged in slot 194.

*Splice detector*

A micro-switch S2-7 (see FIG. 1) mounted on one end of platen 32 has a roller 220 which is adapted to engage the print material 28, and to be held thereby in an open position. The print material 28 is provided with an opening therethrough, not shown, in advance of a splice and in alignment with roller 220. Accordingly, when the print material 28 containing a splice is advanced following the exposure, and roller 220 drops through the opening in the material prior to the splice, micro-switch S2-7 is closed energizing a relay which holds solenoid L2-1 energized and dog 142 in its unlatched position, permitting the drive means to continue to advance the print material 28 until the opening actuates another micro-switch S1 (see FIGS. 1 and 13) which has a roller contact 224 adapted to drop through the opening into the space between rubber rings 226 of transport roller 126 (see FIG. 11). This micro-switch S1 opens the electrical circuit to solenoids L2-1, causing dog 142 to return to its latched position to stop the paper advance. The micro-switch S1 is so located that the splice is clear of the exposure station 30 when it is actuated. The solenoid L2-2 remains energized during the advance of print material 28 until a clip 192 on programming drum 178 actuates micro-switch S2-4 de-energizing solenoid L2-2 causing dog 166 to return to its latched position stopping the drum advance. This would normally occur before the drive means has advanced the splice through the exposure station 30.

*Cycle of operation*

The operation of this automatic package printer will be described by tracing the operation of the printer in producing a typical package of prints having a horizontal print format. A popular package, particularly for school use, comprises on 5 x 7-inch print, four 2½ x 3½-inch wallet size prints, and 18 1⅔ x 2⅓-inch trading prints, or 4 print groups in all. To produce this package, a programming drum 178 is selected having a 32-tooth gear 180 and eight actuating holes per row. The clips 192 are inserted into drum 178 to that printer 18, on the first exposure, projects three image groups simultaneously on print material 28, then advances the print material 14 inches, and projects an image of the 9-print group only on the second exposure, and advances the print material 28 another 14 inches to clear the exposure station 30 for the next package. Since this programming drum 178 has 8 holes per roll as indicated heretofore, but the total print material advance for the package is only four 7-inch advances, two identical package setups may be programmed one after the other on this drum using the clips 192. Hence, the programming drum 178 will turn only one-half revolution per package. The steps in operating the printer 18 begin with pushing the off-operate-standby switch S4 from the standby position to the operating position. This turns on printing lamp 24, and the print material drive motor, not shown. The proper negative is mounted in the negative holder. The operator then depresses a foot switch to initiate the first exposure and the printing sequence is as follows: The relay K3–3 is energized through the switches S5–1, S5–2, S5–3, S5–4 and S5–5 which are actuated by the shutters 34. When K3–3 pulls in, the following occurs: (1) The operator's viewing shutter is closed by deenergization of L1–10 and energization of L1–9. (2) The lamp shutter is opened to allow passage of the light beam by deenergization of solenoid L1–12 and energization of solenoid L1–11. The actuation of the lamp shutter opens the "IN" switch S5–5 and closes the "OUT" switch S5–5. This causes the following: (a) The light beam relays K2–1, K2–2 and K3–3 are energized actuating the three shutters 34, 36 in the printing beams which are moved to their unblocked position simultaneously to allow passage of the light beams through each lens unit. The electronic timing unit shown schematically in FIG. 14, times out the three shutters which are closed simultaneously. When all three shutters are closed, the electrical circuit to drum solenoid L2–2 is completed which is energized moving dogs 142–166 to their unlatched position permitting print material 28 to be advanced and programming drum 178 to be rotated. One of the pre-set clips 192 on the drum actuates a switch S2–4 de-energizing solenoid L2–2 allowing dogs 142, 166 to return to their latched position to stop the print material advance and programming drum 178. The dogs 142, 146 in returning to their latched position also actuate a switch S9 initiating a second exposure. Only the shutter blade 34 covering the 9-lens cluster is moved to its unblocking position for this exposure because only the micro-switch S2–2 which controls the center printing beam shutter 34 is depressed by a clip 192. This exposure is timed out by the timing unit in the same manner as the previous one. At the completion of this exposure, the solenoid L2–2 is again energized starting the print material advance and the programming drum 178 to rotate. Shortly after the print material advance is initiated, the clip 192 in the fifth row of holes on drum 178 actuates the end of cycle switch S2–5 causing the lamphouse shutter to close, the viewing shutter to open, and the print material to continue to advance for 14 inches clearing the exposure station 30 so that the print material 28 is in position for the next exposure. This length of advance of the print material 28 is controlled by the proper insertion of a clip 192 in one of the rows in the programming drum 178 as indicated heretofore. This completes the cycle of operation for this particular package. The reason the end of cycle switch S2–5 is placed at the beginning of the final print material advance is to allow the operator to advance the negative, center it, and adjust a spot monitor, if one is used, during the final paper advance.

The invention has been described in detail with particular reference to a preferred embodiment thereof, but it will be understood that variations and modifications can be effected within the spirit and scope of the invention as described hereinabove and as defined in the appended claims.

We claim:

1. In an automatic photographic printer for simultaneously projecting a plurality of groups of images from a single negative onto a photographic light-sensitive material, the combination comprising:
   (A) means for supporting a negative,
   (B) means on one side of said negative supporting means and spaced apart therefrom for supporting a photographic light-sensitive material,
   (C) means on the opposite side of said negative supporting means and spaced apart therefrom for projecting a main light beam through said negative, and
   (D) a unitary optical system interposed between said negative supporting means and said light-sensitive material for simultaneously producing a plurality of groups of images of different sizes and directing said images onto said light-sensitive material for exposing same, said unitary optical system comprising a cup-shaped housing having a transparent window at each end thereof, a plurality of separate lens units supported by said housing, a plurality of light beam splitters and mirrors supported by said housing for dividing said main light beam into a plurality of secondary light beams of varying intensity and directing each of said secondary light beams through a corresponding one of said lens units, and a cover for said housing.

2. The invention according to claim 1 wherein said cover has a transparent window through which the operator may observe the negative, and a shutter for covering said window during a printing operation.

3. The invention according to claim 1 and further including a light-tight cabinet enclosing said light-sensitive material supporting means and having an opening through which said images are directed, said unitary optical system having a light shield interconnecting one of said windows to said opening.

4. The invention according to claim 3 wherein said light shield comprises an open ended box-like member adapted to telescope within said opening, said member adapted to be movable between an operative position in which it interconnects said window to said opening to prevent light leak, and an inoperative position in which it telescopes within said cabinet to facilitate removal of said unitary optical system.

5. The invention according to claim 4 and further including a detent means interposed between said light shield and said cabinet for releasably holding said light shield in its inoperative position.

6. In a unitary optical system insertable between a negative and a light-sensitive material in a photographic printer for producing a plurality of groups of images of different sizes and directing said images onto said material, the combination comprising:
   (A) a plurality of separate lens units,
   (B) means for dividing a main light beam directed through said negative and into said optical system into a plurality of secondary light beams of varying intensity and directing each of said secondary light beams through a corresponding one of said lens units for simultaneously producing and projecting a plurality of groups of images of different sizes onto said light-sensitive material, said dividing means including baffles for isolating said secondary light beams from one another, some of which are apertured to allow the passage therethrough of a corresponding secondary light beam, and shutter means for each of said secondary light beams selectively movable between a blocking position for blocking passage of said light beam, and an unblocking position allowing said secondary light beam to pass through said optical system.

7. In a unitary optical system interposed between a negative and a light-sensitive material in a photographic printer for producing a plurality of groups of images of different sizes and directing said images onto said material, the combination comprising:
- (A) a cup-shaped housing having a transparent window at each end thereof,
- (B) a plurality of separate lens units supported by said housing,
- (C) a plurality of light beam splitters and mirrors supported by said housing for dividing a main light beam entering one of said windows into a plurality of secondary light beams of varying intensity and directing each of said secondary light beams through a corresponding one of said lens units and said other window for simultaneously producing and projecting a plurality of groups of images of different sizes onto said light-sensitive material, and
- (D) a cover for said housing.

8. The invention according to claim 7 wherein said cover has a transparent window through which the operator may observe the negative, and a shutter for covering said window during a printing operation.

9. In an automatic photographic printer for sequentially and simultaneously projecting a plurality of groups of images from a single negative onto a photographic print material in side-by-side relation to produce a predetermined package of image exposures, the combination comprising:
- (A) means for supporting a negative,
- (B) means on one side of said negative supporting means and spaced apart therefrom for supporting a photographic light-sensitive material in an exposure station for exposure,
- (C) means on the opposite side of said negative supporting means and spaced apart therefrom for projecting a light beam through said negative,
- (D) means interposed between said negative supporting means and said light-sensitive material for receiving said light beam and producing a plurality of groups of images of different size and identical color balance and density and simultaneously directing said images onto said light-sensitive material in side-by-side relation for exposing a portion thereof,
- (E) means for selectively controlling the number of said groups of images directed onto said light-sensitive material,
- (F) means for transporting said light-sensitive material through said exposure station to move the exposed portion out of said exposure station and present a new portion thereof for exposure, and
- (G) means for programming said controlling means and said transporting means for operation in timed relation to produce a predetermined package of image exposures on said light-sensitive material.

10. The invention according to claim 9 wherein said images producing and directing means comprises a unitary optical system.

11. The invention according to claim 10 wherein said optical system comprises a housing, a plurality of separate lens units supported by said housing, and a plurality of light beam splitters and mirrors supported by said housing for dividing said light beam into portions of varying intensity and directing each of said portions through a corresponding one of said lens units.

12. The invention according to claim 10 wherein said unitary optical system is removably insertable between said negative and said light-sensitive material.

13. The invention according to claim 10 wherein said unitary optical system comprises a cup-shaped housing having a transparent window at each end thereof, a plurality of separate lens units supported by said housing, a plurality of light beam splitters and mirrors supported by said housing for dividing said light beam into portions of varying intensity and directing each of said portions through a corresponding one of said lens units, and a cover for said housing.

14. The invention according to claim 13 wherein said cover has a transparent window through which the operator may observe the negative, and a shutter for covering said window during a printing operation.

15. The invention according to claim 9 and further including a lighttight cabinet enclosing said light-sensitive material supporting means and having an opening through which said images are directed, said producing and directing means comprises a unitary optical system having a window through which said images are directed, and a light shield interconnecting said window to said opening.

16. The invention according to claim 9 wherein said producing and directing means comprises a plurality of separate lens units, and light beam splitters and mirrors for dividing said light beam into portions of varying intensity and directing each portion through a corresponding one of said lens units, and said controlling means comprises shutter means for each of said portions of said light beam and selectively movable between a blocking position for blocking passage of said portion, and an unblocking position allowing said portion to be directed on said light-sensitive material.

17. The invention according to claim 9 wherein said programming means comprises a rotatable drum having means thereon for actuating said controlling means and said transporting means in timed relation.

References Cited by the Examiner

UNITED STATES PATENTS

| | | | |
|---|---|---|---|
| 2,016,937 | 10/35 | Barnes | 352—60 X |
| 2,058,415 | 10/36 | Chretien. | |
| 2,137,570 | 11/38 | Gilmore | 88—1 |
| 2,152,224 | 3/39 | Thomas | 95—12.2 |
| 2,496,272 | 2/50 | Current | 88—24 |
| 2,533,719 | 12/50 | Cristiani | 352—60 |
| 2,557,685 | 6/51 | Rabinowitz et al. | 88—24 |
| 2,874,239 | 2/59 | Doneit | 200—38.2 |
| 3,055,993 | 9/62 | Kripke et al. | 200—33 |

NORTON ANSHER, *Primary Examiner.*

EMIL G. ANDERSON, EVON C. BLUNK, *Examiners.*